United States Patent Office 3,723,372
Patented Mar. 27, 1973

3,723,372
BLOCKED POLYURETHANES SOLUBLE OR COMPATIBLE IN WATER ORGANIC SOLVENTS AND POLYOLS
Saburo Wakimoto, Hyogo, Hideyosi Tugukuni, Osaka, Masafumi Kano, Kyoto, Yutaka Matsui, Hyogo, and Jugo Goto, Osaka, Japan; said Matsui and said Goto assignors to Takeda Chemical Industries, Ltd., and said Wakimto, Tugukuni and said Kano assignors to Dai Nippon Toryo Co., Ltd., both of Osaka, Japan
No Drawing. Filed Apr. 29, 1970, Ser. No. 33,081
Claims priority, application Japan, Apr. 30, 1969, 44/33,878
Int. Cl. C08g 51/24, 51/26, 22/32
U.S. Cl. 260—29.1 R                 6 Claims

ABSTRACT OF THE DISCLOSURE

Novel partially blocked isocyanate polymers suitable for the preparation of three dimensional coating films are prepared. The coating films are prepared by heating the blocked isocyanates in the presence of an active hydrogen containing compound.

---

The present invention is concerned with a method for the production of a blocked polyurethane which is useful as a coating agent.

As a polyurethane type coating agent, there have been put into practical use so-called two-can type polyurethane coating compositions. In the two-can type compositions, free NCO-terminated compounds are prepared, on one hand, and compounds having terminal active hydrogen atoms are prepared, on the other hand, and upon application, these two components are admixed with each other. However, in these compositions, there have been pointed out such defects that the NCO components have only a poor pot-life because of high reactivity of free NCO groups with moisture and other active hydrogen-containing substances, and further the mixing procedure upon application is rather troublesome and thus not advantageous from an industrial point of view.

For the purpose of removing these defects, so-called one-can type polyurethane coating compositions have been proposed. The one-can type compositions consist of a high molecular blocked polyisocyanate compound or of a mixture of a low molecular blocked polyisocyanate compound and a high molecular polyol compound. In other words, in the one-can type composition, a blocked polyisocyanate is used in place of a polyisocyanate having free NCO groups. However, hitherto known blocked polyisocyanates have the defect of poor compatibility with water, various organic solvents and polyester polyols, polyether polyols and other active hydrogen-containing polymers, and therefore these known blocked polyisocyanates cannot give homogeneous coating films, and thus produced coating films have quite a low gloss.

When coating agents are intended for use as top-coat for automobiles, buildings, furniture, electric goods, etc. high gloss of the coating film is necessarily required. Therefore, "low gloss" of a coating film is a rather fatal defect from a practical point of view. In fact, one-can type polyurethane coating composition using hitherto known blocked polyisocyanate have not yet been put into practical use except in a very particular field of art.

Additionally stated, aliphatic polyisocyanates such as $\omega,\omega'$-diisocyanate dimethyl benzene (XDI), hexamethylene diisocyanate (HMDI), isophorone diisocyanate (IPDI) and 4,4' - methylene-bis(cyclohexylisocyanate) ($H_{12}$-MDI) have been considered as isocyanate components for the production of a polyurethane coating film having a high resistibility against light (e.g. sun-light, UV-ray, etc.), but, in hitherto known blocked polyisocyanates derived from the aliphatic polyisocyanates, lower compatibility with water, organic solvents and resins is much remarkable than in blocked aromatic polyisocyanates. Therefore, blocked aliphatic polyisocyanates have been nearly impossible to use as isocyanate components for coating compositions.

Under these circumstances, the present inventors have extensively studied the provision of novel blocked type polyisocyanates which are useful for one-can type polyurethane coating agents and have no defects such as those which accompany with the known blocked polyisocyanates, and the staudy has led us to the present invention.

Thus, the principal object of the present invention is to provide novel blocked type polyisocyanates which are usable as one-can type polyurethane coating agents and can give a homogeneous coating film having high gloss. Another object of the present invention is to provide a method for the production of the novel blocked type polyisocyanates as mentioned just above.

In the method of the present invention, a partially blocked polyisocyanate having at least one free NCO group and at least one blocked NCO group per molecule is allowed to react with a high molecular weight active hydrogen-containing compound, wherein the sum of (a) the free NCO and blocked NCO groups per molecule of the partially blocked polyisocyanate to be used and (b) the active hydrogen atoms per molecule of the high molecular active hydrogen-containing compound to be reacted with the polyisocyanate, is at least 5, at such a ratio that (active hydrogen atoms)/(free NCO groups) is at least 1 and (active hydrogen atoms)/(free NCO groups +blocked NCO groups) is about 0.6 to about 1.5, whereby there is produced a high molecular compound containing in its at least one urethane linkage, etc., and having blocked NCO groups and active hydrogen atoms, the total number of blocked NCO groups and active hydrogen atoms being at least 3 per molecule, but having substantially no free NCO group.

The subject compound of the present invention can easily be converted to a cross-linked polymeric substance by heating without using other active hydrogen-containing polymers and it is highly soluble in or compatible with various organic solvents and polyether polyols, polyester polyols and other active hydrogen-containing polymers even when an aliphatic polyisocyanate (e.g. XDI, HMDI, $H_{12}$-MDI, IPDI, etc.) is used as the base of the partially blocked polyisocyanate. Therefore, the subject compound of the present invention as such can be used as a so-called one-can type urethane coating agent and can give a homogeneous and highly glossy coating film. Particular advantage of the present invention is found in the case of using an aliphatic polyisocyanate (e.g. XDI, HMDI, $H_{12}$-MDI, IPDI, etc.) as the base of the partially blocked polyisocyanate, namely, use of the present invention, it becomes, for the first time, possible to produce a one-can type urethane coating agent which can give a polyurethane coating film having high gloss as well as high light stability.

Furthermore, according to the present invention, a urethane coating agent of excellent solubility in water can be produced by using, as an active hydrogen component, a compound having hydrophilic groups, even though a urethane coating agent of such high solubility in water as describe above cannot be produced by hitherto known methods even if a compound having many hydrophilic groups is used. The subject compound of high solubility into water can be formulated in an aqueous solution, and the thus prepared solution can advantageously be applied on a substrate by an electro deposition coating technique, while this technique cannot be used when the coating agent is of low or poor solubility in water.

A detailed description of the method of the present invention is given below.

The one starting material of the present method is a partially blocked polyisocyanate having at least one free NCO group and at least one blocked NCO group per molecule, more particularly, with the proviso that the total number of the free NCO groups and the blocked NCO groups per molecule is up to 8. Use is generally made of a partially blocked di- or triisocyanate having 1 to 2 free NCO groups and 1 to 2 blocked NCO groups per molecule, which includes a diisocyanate having one free NCO group and one blocked NCO group per molecule, a triisocyanate having one free NCO group and two blocked NCO groups per molecule and a triisocyanate having two free NCO groups and one blocked NCO group per molecule. These partially blocked polyisocyanates are prepared by allowing a polyisocyanate to react with a blocking agent in an amount of about 0.04 to about 0.7 mole per NCO group in a conventional manner, for example, by heating at about 50 to about 160° C. in the presence or absence of an inert solvent and a catalyst. As the inert solvent may be mentioned esters (e.g. ethyl acetate, butyl acetate, etc.), ketones (e.g. methylethyl ketone, methylisobutyl ketone, etc.), ethers (e.g. diethyl ether, ethoxyethyl acetate, etc.) and aromatic hydrocarbons (e.g. benzene, toluene, etc.). The catalyst may be tertiary amines (e.g. triethylamine, triethylene diamine, N-methyl morpholine, etc.) and organic tin compounds (e.g. stannous octoate, dibutyltin dilaurate, tetraalkyl distannoxanes, etc.). The reaction mixture, occasionally, contains unreacted polyisocyanate or completely blocked polyisocyanate. In the present method, the reaction mixture as such may be used without purification, but, desirably, the unreacted polyisocyanate and completely blocked isocyanate are removed from the reaction mixture by a suitable manner such as extraction, distillation, adsorption, thin film evaporation, filtration, recrystallization, etc. The removal of these by-products is particularly desirable when the product is allowed to react with an acrylic acid type polyol mentioned hereinafter. The amount of the blocking agent is, as mentioned above, about 0.04 to about 0.8 mole per NCO group, and, more preferably, about 0.1 to about 0.3 mole per NCO group when the reaction product is used in the subsequent step after removing the above mentioned by-products, and about 0.4 to about 0.6 mole per NCO group when the reaction product as such is used in the subsequent step without removing the by-products.

The polyisocyanate employed for the reaction with a blocking agent may be any of the hitherto known ones including aromatic polyisocyanates, aliphatic isocyanates and other type polyisocyanates, among which di- or triisocyanates are preferable. Typical examples of the polyisocyanates are ethylene diisocyanate, propylene diisocyanate, tetramethylene diisocyanate, hexamethylene diisocyanate, ω,ω'-diisocyanate-1,3-dimethyl benzene, ω,ω'-diisocyanate-1,4-dimethyl benzene, 1-methyl-2,4-diisocyanate cyclohexane, ω,ω'-diisocyanate diethyl benzene, ω,ω'-diisocyanate dimethyl toluene, ω,ω'-diisocyanate diethyl toluene, ω,ω'-diisocyanate dimethyl xylene, ω,ω'-diisocyanate diethyl xylene, 4,4'-methylene-bis(cyclohexyl isocyanate), 4,4'-ethylene-bis(cyclohexxyl isocyanate), phenylene diisocyanate, 2,4-tolylene diisocyanate, 2,6-tolylene diisocyanate, 2,6-tolylene diisocyanate, naphthylene diisocyanate, 4,4'-methylene-bis(phenyl isocyanate), isophorone diamine diisocyanate, lysine diisocyanate, triphenylmethane triisocyanate, triphenylsulfone triisocyanate, trimethylbenzene-2,4,6-triisocyanate, 1-methylbenzene-2,4,6-triisocyanate, diphenyl-2,4,4'-triisocyanate, etc., polyisocyanates prepared by reacting an excess amount of the above mentioned isocyanate with a low molecular polyol having 2 to 8 OH groups per molecule (e.g. ethylene glycol, propylene glycol, 1,3-butylene glycol, neopentyl glycol, 2,2,4-trimethyl-1,3-pentandiol, hexamethylene glycol, cyclohexane dimethanol, trimethylol propane, hexane, triol, glycerine, sorbitol, sorbitan, sucrose, pentaerythritol, etc.), trimers of diisocyanates (e.g. TDI trimer, XDI trimer, etc.), and other various polyisocyanates containing biuret linkages and and/or allophanate linkages. Among these examples, aliphatic ones such as ethylene diisocyanate, tetramethylene diisocyanate, hexamethylene diisocyanate, 4,4'-methylene-bis(cyclohexyl isocyanate), 4,4'-ethylene-bis(cyclohexyl isocyanate), ω,ω'-diisocyanate-1,3-dimethyl benzene, isophorone diisocyanate, ω,ω'-diisocyanate-1,4-dimethyl benzene are desirably employed. Polyisocyanates derived from an excess amount of these aliphatic isocyanates with the above mentioned low molecular polyol are also desirable. The most desirable one among these aliphatic isocyanates is 4,4'-methylene-bis(cyclohexyl isocyanate) or a product of an excess amount of this compound with the low molecular polyol, because a coating film prepared according to the present method by using these isocyanate compounds shows high resistance to degradation by soot and smoke.

As the blocking agent, any of hitherto known ones may be used in this method. Typical examples of them are phenol types (e.g. phenol, cresol, xylenol, nitrophenol, chlorophenol, ethyl phenol, t-butylphenol, hydroxy benzoic acid, hydroxy benzoic acid esters, 2,5-di-t-butyl-4-hydroxy toluene, etc.), lactam types (e.g. ε-caprolactam, δ-valerolactam, γ-butyrolactam, β-propiolactam, etc.), active methylene types (e.g. diethyl malonate, dimethyl malonate, ethyl acetoacetate, methyl acetoacetate, acetyl acetone, etc.), alcohol types (e.g. methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrine, ethylene bromhydrine, 1,3-dichloro-2-propanol, ω-hydroperfluoro alcohol, acetocyanhydrine, etc.), mercaptan types (e.g. butyl mercaptan, hexyl mercaptan, t-butyl mercaptan, t-dodecyl mercaptan, 2-mercapto-benzothiazole, thiophenol, methyl thiophenol, ethyl thiophenol, etc.), acid amide types (e.g. acetoanilide, acetoanisidine amide, acrylamide, methacrylamide, acetic amide, stearic amide, benzamide, etc.), imide types (e.g. succinimide, phthalimide, maleimide, etc.), amine types (e.g. diphenylamine, phenylnaphthylamine, xylidine, N-phenyl xylidine, carbazole, aniline, naphthylamine, butylamine, dibutylamine, butyl phenylamine, etc.), imidazole types (e.g. imidazole, 2-ethylimidazole, etc.), urea types (e.g. urea, thiourea, ethylene urea, ethylene thiourea, 1,3-diphenyl urea, etc.), carbamate types (e.g. N-phenyl carbamic acid phenyl ester, 2-oxazolidone, etc.), imine types (e.g. ethylene imine, etc.), oxime types (e.g. formaldoxime, acetaldoxime, acetoxime, methylethyl ketoxime, diacetylmonoxime, benzophenonoxime, chlorohexanonoxime, etc.) and sulfurous acid salt types (e.g. sodium bisulfite, potassium bisulfite, etc.). Among these examples, use is desirably made of the phenol types, lactam types, active methylene types, and oxime types.

The other starting material of this method is a high molecular weight active hydrogen-containing compound.

The source of the active hydrogen atom is exemplified by —OH, —NH₂, —NH, —SH, —COOH, etc., among which —OH is preferable. The molecular weight of the compound is about 300 to about 30,000, more desirably about 800 to about 10,000. The number of the active hydrogen atoms (e.g. the number of OH groups) per molecule of this compound is not less than 2, more particularly 2 to 20, and preferably 3 to 12. The following are typical examples of the active hydrogen-containing polymers usable in this method:

(a) Polyether polyols having a molecular weight of about 500 to about 4000, more preferably about 800 to about 2500, which are prepared by subjecting an alkylene oxide (e.g. ethylene oxide, propylene oxide, tetrahydrofurane, etc.) to addition polymerization with a low molecular weight polyol having 2 to 8 carbon atoms and molecular weight of about 50 to about 300 (e.g. ethylene glycol, diethylene glycol, propylene glycol, dipropylene glycol, glycerine, trimethylol propane, 1,2,6-hexane triol, pentaerythritol, soribitol, sorbitan, sucrose, etc.). When ethylene oxide is used solely or in combination with another alkylene oxide as the alkylene oxide component, the subject blocked polyurethane of the present invention demonstrates high solubility in water.

(b) Polyester polyols having a molecular weight of about 500 to about 4,000, more preferably about 800 to about 2,500, which are prepared by reacting the low molecular weight polyol as mentioned above or an epoxy compound e.g. fatty acid glycidyl esters, etc. with a polycarboxylic acid (e.g. adipic acid, succinic acid, maleic acid, phthalic acid, terephthalic acid, etc.) or its derivatives.

(c) Polyester polyols having a molecular weight of about 500 to about 4,000, more preferably about 800 to about 2,500, which are prepared by ring-opening polymerization of a cyclic ester, such as polycaprolactone, polybutyrolactone, etc.

(d) Esters of the low molecular polyol as mentioned above with a higher fatty acid, the molecular weight thereof being about 500 to about 4,000, more preferably about 800 to about 2,500, which are exemplified by mono-, di- or triethylene glycol mono-, or diricinolate, 1,2,6-hexanetriol mono-, di- or triricinolate, trimethylol propane mono-, di- or triricinolate, pentaerythritol mono-, di-, tri- or tetraricinoleate, erythritol mono-, di-, tri- or tetraricinoleate, castor oil, hydrogenated castor oil, mono- or diglyceride of a castor oil fatty acid or hydrogenated castor oil fatty acid, coconut oil fatty acid, fatty acid glycidyl ester, etc.

(e) Acrylic type polyols having a molecular weight of about 500 to about 30,000, more preferably about 1,000 to about 10,000, which are prepared by polymerization of a compound of the general formula

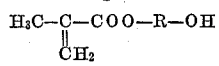

or

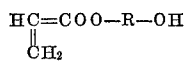

(wherein R is lower alkylene having 1 to 6 carbon atoms, such as methylene, ethylene, propylene, methyl methylene, isopropylene, butylene, isobutylene, etc.) or by copolymerization of the above mentioned compound with other polymerizable unsaturated compound (e.g. styrene, acrylic acid, dibutyl fumarate, methacrylic acid, acrylic acid esters, methacrylic acid esters, ethylene, propylene, vinyl chloride, vinylidene chloride, butadiene, isoprene, vinyl acetate, etc.). The number of OH groups per molecule of the homopolymers or copolymers of this class can be varied in wide range based on the kind of the starting monomer or monomers used as well as the polymerization degree, but use is preferably made of those having 2 to 20 OH groups, and more preferably, 4 to 12 OH groups per molecule. The polymers of this class employable in this method are particularly exemplified by homopolymers of the compound of the above formula, whose polymerization degree is about 5 to about 15 and copolymers of the compound of the above formula with one or more of polymerizable monoethylenically unsaturated monomers, the content of the compound of the above formula in the copolymers being about 5 to about 95 weight parts and the molecular weight of the copolymers being about 300 to about 30,000. These acrylic type polymers may be prepared in the manner described in, for example, U.S. Pat. 3,028,367 and Japanese patent publication No. 9240/1968.

(f) Urethane modified polyols, which are prepared by reacting excess amounts of above mentioned polyether polyols or polyester polyols (a, b, c, etc.) with an organic polyisocyanate.

(g) Other active hydrogen-containing polymers per se known, e.g. polyamide polyamines, polyethylene imines, polyvinyl alcohol, polyvinyl alcohol-vinyl pyrrolidone copolymers, etc.

Among the high molecular active hydrogen-containing compounds, use is desirably made of the polyether polyols (a), the polyester polyols (b, c) and the acrylic type polyols (e).

In the present method, the sum of the number of blocked NCO and free NCO groups per molecule of the partially blocked polyisocyanate to be used and the number of active hydrogen atoms per molecule of the active hydrogen-containing compound to be reacted with the partially blocked polyisocyanate should be at least 5. The upper limit of this sum is determined by the maximum sum of free NCO groups and blocked NCO groups per molecule of the partially blocked polyisocyanate employable and by the maximum number of active hydrogen atoms per molecule of the active hydrogen-containing compound employable in this method. Namely, the upper limit is practically (8+20=28). But desirably it is 23 and more desirably 15. For instance, when a diisocyanate having one blocked NCO group and one free NCO group is selected as one starting material, a high molecular active hydrogen-containing compound having at least 3, more practically, from 3 to 20 of active hydrogen atoms per molecule is used as the other starting compound, and when a triisocyanate having one blocked NCO group and two free NCO groups or having two blocked NCO groups and one free NCO group is selected as one starting material, a high molecular active hydrogen-containing compound having at least 2, more practically from 2 to 20 of active hydrogen atoms per molecule is used as the other starting compound, and so on.

The ratio of the total number of active hydrogen atoms of the active hydrogen-containing compound to be used the total number of free NCO groups of the partially blocked polyisocyanate to be used is more than 1 but less than 10, more desirably about 1.2 to about 3.0. Further, it is desirable to make the ratio of (the total active hydrogen atoms of the active hydrogen-containing compound to be used)/(the sum of the total free NCO groups and the total blocked NCO groups of the partially blocked polyisocyanate to be used) fall within the range of about 0.5 to about 3.0, more preferably about 0.6 to about 1.5.

In the present method, therefore, the kind of the active hydrogen-containing compound to be used and the kind of the partially blocked polyisocyanate to be reacted therewith as well as the molar ratio between these two starting materials to be reacted with each other should be determined in accordance with the above-mentioned standards.

The partially blocked polyisocyanate and the active hydrogen-containing compound may be used singly or in a suitable combination. The reaction is conducted in an inert solvent at about 50 to about 160° C. As the inert solvent, there may be used that mentioned in connection with the production of the partially blocked polyisocyanate. The use of a catalyst mentioned in the step of the production of the partially blocked polyisocyanate can accelerate the reaction.

By the present method, the blocked NCO groups of the partially blocked polyisocyanate are not directly involved in this reaction, because all free NCO groups of the partially blocked polyisocyanate react with the active hydrogen atoms to form the corresponding linkage (i.e. free NCO group reacts with an active hydrogen radical of HR' of the starting active hydrogen-containing compound to form a linkage of —NHCOR'—, wherein HR' is a radical such as —OH, —NH, =NH, —SH, —COOH, etc.). However, a certain number of active hydrogen radicals (HR's) remain as such in the resulting molecule without reacting with a free NCO group.

Thus, the resulting compound contains blocked NCO groups, and active hydrogen atoms or HR' radical, but contains substantially no free NCO groups. The number of blocked NCO groups contained in the resultant product is substantially the same as the total number of blocked NCO groups of the partially blocked polyisocyanate actually used in the starting material, the number of the —NHCOR'— linkages contained therein is substantially the same as the total number of the free NCO groups of the starting partially blocked polyisocyanate actually used and the number of the active hydrogen atoms or (HR') radicals contained therein is substantially the same as the number obtained by subtracting the total number of the free NCO groups of the starting partially blocked polyisocyanate from the total number of the active hydrogen atoms or radicals (HR') of the active hydrogen-containing compound actually used as the other starting material. And, although the resultant product does not appear to consist of a single compound, the total number of blocked NCO groups and active hydrogen atoms is on the average at least 3 per molecule.

When using a partially blocked di- or triisocyanate containing one free NCO group, including a partially blocked di-isocyanate containing one free NCO group and one blocked NCO group or a partially blocked triisocyanate containing one free NCO group and two blocked NCO groups, which is the most preferable isocyanate employed in the present method, the reaction of this method can in general, be illustrated as follows:

(In the following, $B_{NCO}$ is blocked NCO group, A is a radical derived by removing all NCO groups from a di- or triisocyanate compound, HR' is active hydrogen radical, M is a radical derived by removing all active hydrogen radicals from a high molecular weight "active hydrogen-containing compounds" having a molecular weight of from about 300 to about 30,000, and $m$, $n$, $p$ and $q$ are positive numbers.)

(a) $m(B_{NCO}$—A—NCO$)+(HR')_n$—M→
$(B_{NCO}$—A—NHCOR'$)_m$—M—$(R'H)_{n-m}$ wherein $(2+n)$ is at least 5, more practically 5 to 22, more desirably 5 to 14 and $n/2m$ is more than about 0.5 but less than about 3.0, and more preferably more than about 0.6 but less than about 1.5.

(b)
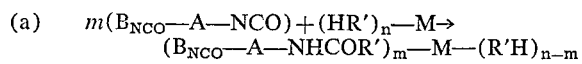
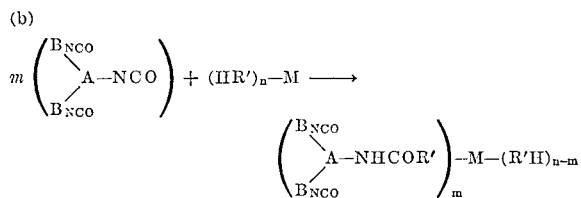

wherein $(3+n)$ is at least 5, more practically 5 to 23, more desirably 5 to 15 and $n/3m$ is more than about 0.5 but less than about 3.0, and more preferably more than about 0.6 but less than about 1.5.

When a partially blocked polyisocyanate containing one free NCO group and more than 2 blocked NCO groups is used, the reaction can be illustrated as below:

(c) $m[(B_{NCO})_p$—A—NCO$]+(HR')_n$—M→
$[(B_{NCO})_p$—A—NHCOR'$]_m$—M—$(R'H)_{n-m}$ wherein $(p+1+n)$ is at least 5, more practically 5 to 28 and more desirably 5 to 20 and $n/m\ (p+1)$ is more than about 0.5 but less than about 3.0, more preferably more than about 0.6 but less than about 1.5, and $p$ is not less than 3, more preferably 3 to 7.

When a partially blocked polyisocyanate containing not less than 2 free NCO groups as well as a certain number of blocked NCO groups is used, there occurs occasionally gelation of the product. For the purpose of preventing the gelation, it is preferable to use the active hydrogen-containing compound in an amount of around one mole, more preferably about 0.7 to about 1.3 mole, per free NCO group of the partially blocked polyisocyanate. In this case, the reaction is illustrated as follows:

(d) $(B_{NCO})_p$—A—$(NCO)_q+q(HR')_n$—M→
$(B_{NCO})_p$—A—$[NHCOR'$—M—$(R'H)_{n-1}]_q$ wherein $(n+p+q)$ is at least 5, more practically 5 to 28 and more desirably 5 to 20, $nq/(p+q)$ is more than about 0.5 but less than about 3.0, more preferably, more than about 0.6 but less than about 1.5, $q$ is not less than 2 and $(p+q)$ is not less than 3, and more practically 3 to 8.

For obtaining the above mentioned products, the aforementioned selection of the both starting compounds to be reacted with each other as well as the aforementioned molar ratio between the two compounds to be used are essential. In other words, when the two starting compounds are selected according to the aforementioned standard for the selection and thus selected compounds are allowed to react with each other in the molar ratio as mentioned before, the above-described products are necessarily obtained.

The product obtained by this method does not necessarily consists of a single component, but is accompanied with some by-products, and thus, the formula mentioned above is an average one for purposes of illustration. But, the product which consists chiefly of the compound mentioned before, and the by-products has substantially the same properties as the compound itself. In fact, the product as such obtained by this method can be used as a coating agent or for other purposes without subjecting it to a further treatment.

When heating the thus produced product, the blocked NCO group or groups are split off to regenerate the free NCO group or groups and thus regenerated NCO group or groups react in turn with the active hydrogen atom or atoms, whereby a cross-linked resin is produced. The product obtained by this method is highly soluble in or compatible with water and organic solvents, and therefore can be used as a one-can type polyurethane coating agent either as a solution of this compound in water or in organic solvents such as esters (e.g. ethyl acetate, butyl acetate, etc.), ketones (e.g. methylethyl ketone, methylisobutyl ketone, etc.), ethers (e.g. diethyl ether, ethoxy ethyl acetate, etc.) and aromatic hydrocarbons (e.g. benzene, toluene, etc.). The content of the polyurethane compound in the solution is about 0.1 to about 80%, more practically 1 to 70%. Into the solution may be incorporated pigments, catalysts, fillers, leveling agents, stabilizers, antioxidants, etc.

The solution is applied on a substrate and heated at about 100 to about 250° C. to give cured coating film.

The polyurethane compound of this method can be used as a coating agent for top-coats or under-coats of various substrates, such as automobiles, buildings, furnitures, electric goods, etc., and further can be used as an adhesive agent, a finishing agent for fibrous materials, etc.

In the following examples, "part" is "weight part" unless otherwise stated, and the relation between "part by weight" and "part by volume" is the same as that between "gram" and "milliliter."

EXAMPLE 1

To 393 parts of 4,4'-methylene-bis(cyclohexylisocyanate) is added 97 parts of butyl p-hydroxybenzoate (OH/NCO=⅙)

in 97 parts of ethyl acetate. To the mixture is further added, as a catalyst, 0.14 part of tetra-n-butyl-1,3-diacetoxydistannoxane, followed by heating at 90° C. for 5 hours. The resultant product is extracted with n-hexane to remove unreacted diisocyanates and the residue is dissolved in 400 volume parts of ethyl acetate. The solution is filtered to remove insoluble materials. The content of ethyl acetate in thus obtained filtrate is adjusted to 50% by weight.

The thus treated ethyl acetate solution has an amine equivalent of 901 (theoretical value: 912). Good identity of the found amine equivalent with the theoretical one proves that the solution contains substantially only an adduct of 1 mole of the diisocyanate and 1 mole of the blocking agent (p-hydroxy benzoic acid butyl ester).

90 parts of the solution (0.1 mole part as the partially blocked isocyanate) is reacted with 55.8 parts (0.036 mole part) of a polyester polyol (prepared from phthalic acid, trimethylol propane and 1,3-butane-diol; molecular weight: 1560, OH number; 181) (NCO/OH mole=0.55, OH/NCO+blocked NCO=0.91) in 40 parts of cyclohexanone at 80° C. for 4 to 5 hours.

The resulting solution is subjected to distillation to remove the solvent completely. The residue is confirmed as having no free NCO group by infrared absorption analysis, (There is observed no absorption maximum at 2250 cm.$^{-1}$ due to NCO group). Average molecular weight of the residue is 2900 (theoretical value: 2821), and OH number is 44 (theoretical value: 45.0).

Good identity of the found OH number and molecular weight with the respective theoretical ones and no IR absorption maximum at 2250 cm.$^{-1}$ shows that the resulting product has averagely the structural formula corresponding to that described in the specification.

Then, the solution as such obtained above is applied on a surface of an iron plate, followed by heating at 160° C. for 30 minutes to give a cured film. The properties of the film are described in Table 1.

TABLE 1

| | |
|---|---|
| Sward hardness | 30 |
| Du Pont impact test (inch, g., cm.) | ¼, 500, 30 |
| Erichsen test (mm.) | 8 |
| Cross-cut adhesion (percent) | 100 |
| Bending test (mm.) | 2 |
| Gloss (60°, percent) | 93 |

(Pigment: titanium dioxide.
Pigment volume concentration (PVC): 40%).

EXAMPLE 2

To 348 parts of tolylene diisocyanate (80% of 2,4-isomer and 20% of 2,6-isomer) is added 87 parts of methylethylketoxime, (OH/NCO=¼), followed by heating at 60° C. for 2 hours. To the resultant product is added 500 parts of n-hexane to precipitate out the resulting compound. The precipitates are recovered by filtration and are washed well with n-hexane, followed by removal of the n-hexane. Thus, an adduct of 1 mol part of tolylene diisocyanate and 1 mole part of methylethylketoxime is produced (melting point: 92° C., amine equivalent: found; 272, theoretical; 261). 136 parts of the adduct (0.5 mole part) is dissolved in 45 parts of acetone, and to the solution is added 336 parts (⅙ mole part) of a polyether polyol (prepared by addition polymerization of ethylene oxide to sorbitol; OH number of 167) (OH/NCO=2.0, OH/NCO+blocked NCO=1.0), followed by heating at 70° C. for 3 hours. The resultant product is subjected to distillation to remove acetone. The thus obtained residue is confirmed as having no free NCO groups by infrared absorption analysis. Average molecular weight of the residue is 2760 (theoretical value: 2799), and OH number thereof is 53 (theoretical value: 60.1).

Thus, it can reasonably be assumed that the product has the following average structural formula:

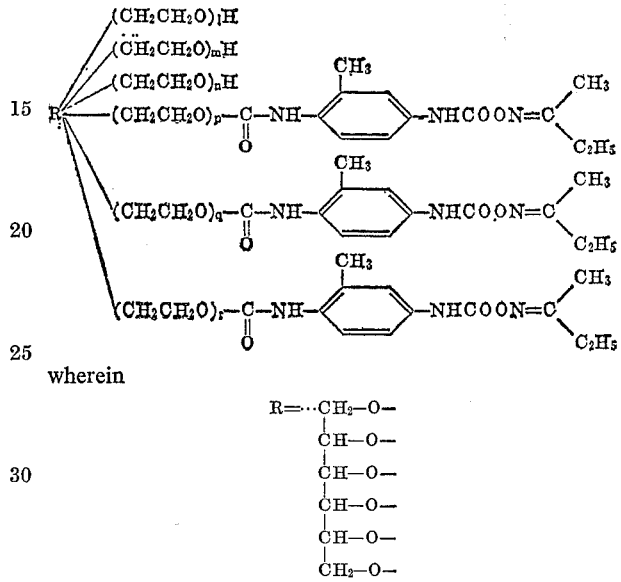

wherein

R= ···CH$_2$—O—
      |
      CH—O—
      |
      CH—O—
      |
      CH—O—
      |
      CH—O—
      |
      CH$_2$—O— and $(l+m+n+p+q+r)$ is about 42.

Thus prepared resin is soluble in water, and therefore can be used as a finishing agent for fibrous materials, an aqueous coating agent, an adhesive agent, etc.

EXAMPLE 3

To 786 parts of 4,4'-methylene-bis(cyclohexylisocyanate) is added 73 parts of acetoxime (OH/NCO=⅙), followed by heating at 60° C. for 2 hours. To the resultant mixture is added 430 parts of n-hexane, followed by stirring well. The mixture is kept standing and the hexane layer is discarded. The above treatment with n-hexane is repeated ten times. Thus, there is obtained an addition product of 1 mole part of acetoxime and 1 mole part of 4,4'-methylene-bis(cyclohexylisocyanate) which contains substantially no unreacted isocyanate compound. The resultant product is subjected to distillation under reduced pressure to remove n-hexane and to the residue is added butyl acetate so as to give 50% solution. The solution has an amine equivalent of 679 (theoretical value: 670). 68 parts of the solution is mixed with 30.9 parts (OH/NCO=2.0) of a polyesterpolyol (prepared from trimethylolpropane and phthalic acid, OH value: 364, molecular weight: 926) and 30.9 parts of ethoxyethyl acetate. To the mixture is added 0.26 part of dibutyltin dilaurate, followed by heating at 80 to 90° C. for 8 hours to allow the reaction to take place. After removing the solvent, the resultant product has an OH value of 85.5 (theoretical value: 86.9) and molecular weight of 1902 (theoretical value: 1931) and contains no free NCO group (by infrared absorption analysis). Thus, it can reasonably be assumed that the product has the following average structural formula;

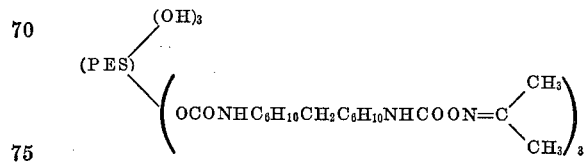

wherein PES is

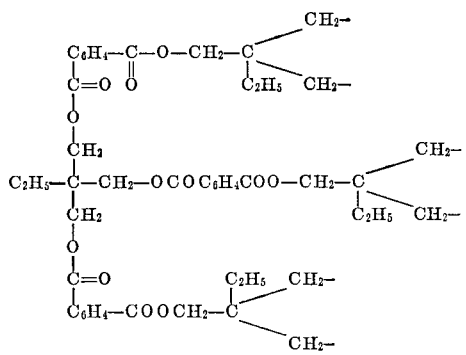

A cured film prepared from the product (cured at 180° C. for 30 minutes) has a gloss (60° %) (pigment: titanium dioxide, PVC: 40%) of 98.5%.

EXAMPLE 4

To 282 parts of ω,ω'-diisocyanate dimethylbenzene is slowly added 50.5 parts of diacetyl monoxime (OH/NCO=⅓) at 60° C. to allow the reaction to proceed. The resultant product is extracted several times with 170 volume parts of a mixture of n-hexane and benzene (1:1) to remove unreacted diisocyanates. The residue is dissolved in ethyl acetate to give 75 weight percent solution. The amine equivalent of the solution is 423.6 (theoretical value: 385.3). To 240 parts of 50% solution of acrylpolyol (a copolymer of styrene, β-hydroxyethyl methacrylate and dibutyl maleate; molecular weight of 4600) in 480 parts of a mixture of butyl acetate and toluene (1:1) (OH number of the solution; 47) is slowly added 46.6 parts of the above obtained ethyl acetate solution (OH/NCO(mole)=1.82 OH/NCO+blocked NCO=0.91), followed by heating at 70 to 80° C. for about 4 to 5 hours. This procedure gives a yellow transparent thermosetting resin solution, which is easily soluble in ethyl acetate, butyl acetate, toluene, xylene, ethoxy ethyl acetate, etc. The resin solution is confirmed as having no free NCO by infrared absorption analysis..

The resin solution obtained above is applied on the surface of an iron plate, followed by heating at 180° C. for 30 minutes, whereby a cured film is obtained. The properties of the film are described in Table 2. When 0.5% of tetra-n-butyl-1,3-diacetoxy distannoxane is mixed with the above resin solution and applied on the iron plate, a cured film can be obtained by heating at 140° C. for 30 minutes.

TABLE 2

| | |
|---|---|
| Sward hardness | 28 |
| Du Pont impact test (inch, g., cm.) | ¼, 500, 50 |
| Erichsen test (mm.) | 8 |
| Bending test (mm.) | 2 |
| Cross-cut adhesion (percent) | 100 |
| Gloss (60°, percent) (Pigment: titanium dioxide, PVC: 40%) | 98 |

EXAMPLE 5

To a mixture of 262 parts of 4,4'-methylene-bis-(cyclohexyl isocyanate) and 349 parts of ethoxy ethyl acetate is added 87 parts of methylethylketoxime(OH/NCO=½), followed by heating at 60° C. for 2 hours, whereby there is produced a partially blocked isocyanate having amine equivalent of 716 (theoretical value: 698).

The resultant is mixed with 563 parts of the same polyester polyol as in Example 1, 563 parts of ethoxyethyl acetate and 0.36 part of tetra-n-butyl-1,3-diacetoxydistannoxane. (OH/NCO=1.82, OH/NCO+blocked NCO=0.91). The mixture is heated at 80° C. for 7 hours. This procedure gives a pale yellow transparent liquid which contains no free NCO groups. The liquid has a viscosity of 400 cps. as a 50% ethoxyethyl acetate solution. The liquid is easily soluble in ester type, ether type, ketone type and aromatic type organic solvents.

The liquid is mixed with 9.1 parts of tetra-n-butyl-1,3-diacetoxy distannoxane, and the mixture is applied on a surface of an iron plate, followed by heating at 140° C. for 30 minutes to give a cured film. The properties of the film are described in Table 3.

TABLE 3

| | |
|---|---|
| Sward hardness | 33. |
| Du Pont impact test (inch, gram, cm.) | ¼, 500, 30. |
| Cross-cut adhesion (percent) | 100. |
| Erichsen test (mm.) | 8. |
| Bending test (mm.) | 2. |
| Gloss (60°, percent) (Pigments: titanium dioxide) 40%. | 99.0. |
| Weathering resistance | No appreciable change is observed after 1000 hours treatment with Weather-o-Meter. |
| Water immersion test | No appreciable change is observed after 240 hours immersion in 25° C. tap water. |

EXAMPLE 6

To 250 parts of 4,4'-methylene-bis(phenylisocyanate) dissolved in 229 parts of ethoxyethyl acetate are added 94 parts of phenol (OH/NCO=½) and 0.12 part of tetra - n-butyl-1,3-diacetyloxydistannoxane, followed by heating at 80° C. for 3 hours. The resultant product has an amine equivalent of 567 (theoretical value: 573). To the resultant product are added 620 parts of a polyester polyol (prepared from phthalic acid, trimethyl propane and lauric acid, OH number of 180, molecular weight of 1880) (OH/NCO=2.0, OH/NCO+blocked NCO=1.0) and 413 parts of ethoxyethyl acetate, followed by heating at 80° C. for 3 hours. Thus obtained product is confirmed as having no free NCO group by infrared absorption analysis.

The product is diluted with 800 parts of ethoxyethyl acetate and applied on a surface of an iron plate, followed by heating at 180° C. for 30 minutes. This procedure gives a cured film having the following properties.

TABLE 4

| | |
|---|---|
| Sward hardness | 31 |
| Du Pont impact test (inch, gram, cm.) | ½, 1000, 50 |
| Cross-cut adhesion (percent) | 100 |
| Erichsen test (mm.) | 8 |
| Bending test (mm.) | 2 |
| Gloss (60°, percent) (Pigment: titanium dioxide, PVC: 40%) | 93.5 |

EXAMPLE 7

To 308 parts of ethoxyethyl acetate are added 262 parts of 4,4'-methylene-bis(cyclohexylisocyanate) and 46 parts of ethyl alcohol (OH/NCO=½), followed by heating at 80° C. to allow a reaction to take place. The resultant product has an amine equivalent of 617 (theoretical value: 616). To the resultant product are then added 564 parts of the same polyester polyol as in Example 1 (OH/NCO=1.82, OH/NCO+blocked NCO=0.91), 564 parts of ethoxyethyl acetate and 1.74 parts of dibutyltin dilaurate, followed by heating at 80° C. for 5 hours. This procedure gives pale yellow transparent liquid which has no free NCO and is easily soluble in aromatic type, ester type, ether type and ketone type organic solvents.

To the liquid is added 17.4 parts of tetra-n-butyl-1,3-diacetoxydistannoxane and the mixture is applied on a surface of an iron plate, followed by heating at 160° C. for 30 minutes, whereby a cured hard film having a homogeneous surface is produced. Gloss (60°, percent) of the film (Pigment, titanium dioxide, PVC: 40%) is 95%.

EXAMPLE 8

To 113 parts of ε-caprolactam in 113 parts of ethoxyethyl acetate is added 262 parts of 4,4'-methylene-bis-(cyclohexyl isocyanate) (OH/NCO=½), followed by heating at 130° C. for 3 hours. The resultant product has an amine equivalent of 470 (theoretical value 488). To the resultant product are added 564 parts of the same polyesterpolyol as in Example 1 (OH/NCO=1.82, OH/NCO+blocked NCO=0.91) and 826 parts of ethoxyethyl acetate, followed by heating at 100° C. for 5 hours. This procedure gives a pale yellow transparent liquid which contains no NCO group. The liquid has a viscosity of 320 cps. as 50% ethoxyethyl acetate solution. The liquid is easily soluble in ester type, ether type, ketone type alcohol type and aromatic type organic solvents. The liquid is applied on the surface of an iron plate and heated at 160° C. for 30 minutes to produce a cured hard film having a homogeneous surface. Gloss (60°, percent) of the film (Pigment: titanium dioxide, PVC: 40%) is 94%.

EXAMPLE 9

To 168 parts of hexamethylene diisocyanate is added 113 parts of cyclohexanone oxime dissolved in 281 parts of ethoxyethyl acetate, followed by heating at 60° C. for 2 hours. The resultant products has an amine equivalent of 569 (theoretical value: 562). The resulting product is mixed with 563 parts of the same polyesterpolyol as in Example 1

(OH/NCO=1.82, OH/NCO+blocked NCO=0.91)

563 parts of ethoxyethyl acetate and 0.33 part of tetra-n-butyl-1,3-dilauroyloxy distannoxane, followed by heating at 80° C. for 7 hours. This procedure gives a pale yellow transparent liquid which contains substantially no NCO group and is soluble in ester type, ether type, ketone type, aromatic type and alcohol type organic solvents.

The liquid is mixed with 8.3 parts of tetra-n-butyl-1,3-dilauroyloxy distannoxane and the mixture is applied on the surface of an iron, followed by heating at 140° C. for 30 minutes, whereby a hard cured film having a homogeneous surface is obtained.

EXAMPLE 10

To 320 parts of 75% ethyl acetate solution containing a triisocyanate prepared from 3 mole parts of tolylene diisocyanate (80% 2,4-isomer and 20% 2,6-isomer) and 1 mole part of trimethylol propane (Takenate D-102, manufactured and sold by Takeda Chemical Industries, Ltd.) is added 58 parts of methylethyl ketoxime (OH/NCO=⅔)

followed by heating at 70° C. for 2 hours. The resultant product has an amine equivalent of 1152 (theoretical value: 1134). To the resultant product is added 310 parts of the same polyester polyol in Example 6 (OH/NCO=3, OH/NCO+blocked NCO=1.0), followed by heating at 70° C. for 3 hours. The thus produced material has no free NCO group. The material is applied on a surface of iron plate, followed by heating at 180° C. for 30 minutes to give a cured hard film having a homogeneous surface. Gloss (60°, percent) of the film (Pigment: titanium dioxide, PVC: 40%) is 98%.

EXAMPLE 11

To 504 parts of hexamethylene diisocyanate is added 87 parts of methylethyl ketoxime, followed by heating at 60° C. for 2 hours. The resultant product is extracted with n-hexane to remove unreacted diisocyanate and then the n-hexane is removed completely by distillation. The residue has an amine equivalent of 275 (theoretical value: 255). To 220 parts of the residue is added 528 parts of polyether polyol (prepared by addition polymerization of ethylene oxide to a mixture of 1 mole part of sorbitol and 1 mole part of trimethylol propane, OH number of 213, molecular weight of 1184) (OH/NCO=2.5, OH/NCO+blocked NCO=0.8), followed by heating at 70° C. for 3 hours. The resultant product has no free NCO. The resultant product is dissolved in 528 parts of deionized water. The solution thus prepared can be used as a coating agent or finishing agent for fibrous materials.

EXAMPLE 12

To a mixture of 222.3 parts of isophorone diisocyanate and 225.5 parts of ethoxyethyl acetate is added 116.0 parts of methylethyl ketoxime (OH/NCO=⅔), followed by heating at 60° C. for 2 hours. The resultant product has an amine equivalent of 852 (theoretical value: 845.6). To the resultant product are added 744 parts of the same polyester polyol as in Example 1 (OH/NCO=3.6, OH/NCO+blocked NCO=1.2), 496 parts of ethoxyethyl acetate and 1.8 parts of tetra-n-butyl-1,3-diacetoxy distannoxane, followed by heating at 90° C. for 8 hours. The resultant product has an OH value of 54.5 (theoretical value: 54). A cured film prepared from the resultant (cured at 180° C. for 30 minutes) has a gloss (60°, percent) (Pigment: titanium dioxide, PVC: 40%) of 98%.

Reference 1

204 parts of diacetyl monoxime is slowly added to a solution of 188 parts of ω,ω'-diisocyanate dimethylbenzene in 193 parts of ethoxyethyl acetate, followed by heating at 60° C. for 2 hours, whereby there is yielded precipitates. Thus produced precipitates are not soluble in conventional ester type and ketone type solvents, and are not compatible with polyester polyols, polyether polyols, acrylic acid type polyols, etc.

293 parts of the above prepared resultant product is kneaded with 310 parts of the same polyester polyol as in Example 6 and 369 parts ethoxy ethyl acetate, and the kneaded mixture is applied on a surface of an iron plate, followed by heating at 180° C. for 30 minutes. This procedure gives only a heterogeneous film which has Sward hardness of 3 and gloss (60°, percent) of less than 5.

Reference 2

134 parts of trimethylol propane is added to a mixture of 564 parts of ω,ω'-diisocyanate dimethyl benzene and 465 parts of ethoxyethyl acetate, followed by heating at 80° C. for 3 hours. To the resultant product are then added 306 parts of diacetyl monoxime and 204 parts of ethoxyethyl acetate, followed by heating at 60° C. for 2 hours. The resultant product is not soluble in conventional ester type and ether type solvents, and is not compatible with polyester polyols, polyether polyols, and acrylic acid type polyols. 558 parts of the above produced reaction product is kneaded with 310 parts of the same polyester polyol as in Example 6 and 430 parts of ethoxyethyl acetate, and the kneaded mixture is applied on a surface of an iron plate, followed by heating at 180° C. for 30 minutes. This procedure gives only a film having a heterogeneous surface and having Sward hardness of 4 and gloss (60°, percent) of less than 5.

Reference 3

The same procedure as in Reference 1 or 2 is conducted except that various blocking agents are used in place of diacetyl monoxime. Solubility in organic solvents and compatibility with polyols are examined on thus produced substances. The result is as follows.

| Isocyanate compound | Blocking agent | Solubility of the product in ethoxyethyl acetate | Compatibility with polyol | | |
|---|---|---|---|---|---|
| | | | Polyol used in Example 4 | Polyol used in Example 1 | Polyol used in Example 6 |
| XDI (in Ref. 1) | Acetoxime | Insoluble | Incompatible | Incompatible | Incompatible. |
| Do | Methylethyl ketoxime | do | do | do | Do. |
| Do | Cyclohexanonoxime | do | do | do | Do. |
| Do | Phenol | do | do | do | Do. |
| Do | p-Hydroxybenzoic acid butyl ester | do | do | do | Do. |
| Do | Acetyl acetone | do | do | do | Do. |
| TMP-XDI adduct (in Ref. 2) | Acetoxime | Two layers are formed. | do | do | Do. |
| Do | Methylethyl ketoxime | do | do | do | Do. |
| Do | Cyclohexanonoxime | do | do | do | Do. |
| Do | Phenol | do | do | do | Do. |
| Do | p-Hydroxybenzoic acid butyl ester | Homogeneous | do | do | Do. |
| Do | Acetyl acetone | Two layers are formed. | do | do | Do. |

Reference 4

174 parts of methylethyl ketoxime is slowly added to a solution of 262 parts of 4,4'-methylene-bis(cyclohexylisocyanate) in 290 parts of ethoxyethyl acetate, followed by heating at 60° C. for 2 hours, whereby there are produced precipitates. These precipitates are not compatible with polyester polyols, polyether polyols and acrylic acid type polyols.

Reference 5

To a mixture of 786 parts of 4,4'-methylene-bis-(cyclohexyl isocyanate) and 613 parts of ethoxyethyl acetate are added 134 parts of trimethylol propane and 0.62 part of tetra-n-butyl-1,3-diacetyloxydistannoxane, followed by heating at 80° C. for 3 hours. To the resultant product are added 264 parts of methylethyl ketoxime and 176 parts of ethoxyethyl acetate, followed by heating at 60° C. for 2 hours. The resultant product separates into two layers, and is not compatible with polyols.

What we claim is:
1. A substantially water-, organic solvent-or polyol-soluble or -miscible blocked isocyanate polymer comprising a compound of the general formula

$$(B_{NCO}-A-NHCOR')_m-M-(C'H)_{n-m'}$$

wherein $B_{NCO}$ is a blocked NCO group, A is a radical derived by removing all NCO groups from an organic diisocyanate, R'H is an active hydrogen radical, M is a radical derived by removing all active hydrogen radicals from a high molecular weight active hydrogen-containing compound having a molecular weight of about 300 to about 30,000, $n$ and $m$ are positive numbers of not less than 1, selected so that $(2+n)$ is 5 to 22, and $2/2m$ is more than about 0.5 but less than about 3.0.

2. A blocked isocyanate polymer as claimed in claim 1 wherein —A— is —$CH_2(C_6H_{10})CH_2$—,

—$CH_2(C_6H_4)CH_2$—

—$(C_6H_3)(CH_3)$—, —$(CH_2)_6$—,

—$(C_6H_4)$—$CH_2$—$(C_6H_4)$—

—$C_6H_{10}$—$CH_2C_6H_{10}$—, or —$C_6H_7(CH_3)_3$—$CH_2$—.

3. A blocked isocyanate polymer as claimed in claim 1, wherein the radical of —M— is that derived by removing all hydroxy groups from a polyether polyol, a polyester polyol, or a polymer or copolymer of an acrylic acid monoalkylene glycol ester or methacrylic acid monoalkylene glycol ester.

4. A blocked isocyanate polymer as claimed in claim 1, wherein a high molecular active hydrogen-containing compound is that prepared by addition polymerization of ethylene oxide or a mixture of ethylene oxide and other alkylene oxide to a low molecular polyol.

5. A substantially water-, organic solvent-or polyol-soluble or -miscible blocked isocyanate polymer comprising a compound of the general formula of

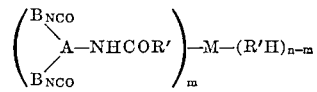

wherein $B_{NCO}$ is a blocked NCO group, A is a radical derived by removing all NCO groups from an organic triisocyanate, R'H is an active hydrogen radical, M is a radical derived by removing all active hydrogen radicals from a high molecular weight active hydrogen-containing compound having a molecular weight of about 300 to about 30,000, $n$ and $m$ are positive numbers of not less than 1, selected so that $(3+n)$ is 5 to 23, and $n/3m$ is more than about 0.5 but less than about 3.0.

6. A blocked isocyanate polymer as claimed in claim 5, wherein a high molecular active hydrogen-containing compound is that prepared by addition polymerization of ethylene oxide or a mixture of ethylene oxide and other alkylene oxide to a low molecular polyol.

References Cited

UNITED STATES PATENTS

| 2,801,990 | 8/1957 | Seeger et al. | 260—75 |
| 2,995,531 | 8/1961 | Hudson | 260—18 |
| 3,115,479 | 12/1963 | Windemuth et al. | 260—47 |
| 3,248,371 | 4/1966 | Damusis | 260—77.5 |
| 3,317,463 | 5/1967 | Schonfeld et al. | 260—47 |
| 3,438,922 | 4/1969 | Ueno et al. | 260—29.3 |
| 3,441,541 | 4/1969 | D'Ancicco et al. | 260—77.5 |

OTHER REFERENCES

Vieweg/Höchtlen-Polyurethane-Kernstatoff Handbuch, Band VII, Carl Hanser Verlag, Munich (1966), pp. 1–14.

DONALD E. CZAJA, Primary Examiner

H. S. COCKERAM, Assistant Examiner

U.S. Cl. X.R.

117—161 KP; 260—18 TN, 29.2 TN, 75 NT, 77.5 TB